United States Patent
Jetcheva et al.

(10) Patent No.: US 8,340,076 B2
(45) Date of Patent: Dec. 25, 2012

(54) MESH NODE MOBILITY ACROSS STATIC AND MOBILE MESH NETWORKS

(75) Inventors: Jorjeta Gueorguieva Jetcheva, Los Gatos, CA (US); Sachin Kanodia, San Jose, CA (US); Sivakumar Kailas, San Jose, CA (US); Murali Repakula, San Jose, CA (US)

(73) Assignee: Firetide, Inc., Los Gatos, CA (US)

( * ) Notice: Subject to any disclaimer, the term of this patent is extended or adjusted under 35 U.S.C. 154(b) by 617 days.

(21) Appl. No.: 12/418,161

(22) Filed: Apr. 3, 2009

(65) Prior Publication Data

US 2009/0190531 A1    Jul. 30, 2009

Related U.S. Application Data

(63) Continuation of application No. PCT/US2007/081325, filed on Oct. 13, 2007.

(60) Provisional application No. 60/829,525, filed on Oct. 13, 2006.

(51) Int. Cl.
*H04L 12/28* (2006.01)
*G06F 15/173* (2006.01)

(52) U.S. Cl. ........ 370/351; 370/392; 370/406; 709/241; 709/244

(58) Field of Classification Search .................. None
See application file for complete search history.

(56) References Cited

U.S. PATENT DOCUMENTS

| | | | |
|---|---|---|---|
| 6,363,319 B1 * | 3/2002 | Hsu | 701/202 |
| 6,400,681 B1 * | 6/2002 | Bertin et al. | 370/218 |
| 6,456,597 B1 * | 9/2002 | Bare | 370/252 |
| 7,286,489 B2 * | 10/2007 | Ades | 370/254 |
| 7,995,501 B2 * | 8/2011 | Jetcheva et al. | 370/255 |
| 2002/0042274 A1 * | 4/2002 | Ades | 455/445 |
| 2003/0016624 A1 * | 1/2003 | Bare | 370/217 |
| 2003/0179742 A1 * | 9/2003 | Ogier et al. | 370/351 |
| 2003/0198213 A1 * | 10/2003 | Jensen et al. | 370/351 |
| 2004/0077320 A1 * | 4/2004 | Jackson et al. | 455/101 |
| 2004/0264451 A1 * | 12/2004 | Kujala et al. | 370/389 |
| 2005/0084263 A1 * | 4/2005 | Norman | 398/19 |
| 2005/0226179 A1 * | 10/2005 | Behroozi | 370/328 |
| 2006/0029060 A1 * | 2/2006 | Pister | 370/389 |
| 2006/0098587 A1 * | 5/2006 | Vasseur et al. | 370/254 |
| 2006/0126502 A1 * | 6/2006 | Vasseur et al. | 370/221 |
| 2006/0146717 A1 * | 7/2006 | Conner et al. | 370/238 |
| 2006/0187884 A1 * | 8/2006 | Ma et al. | 370/332 |
| 2006/0245442 A1 * | 11/2006 | Srikrishna et al. | 370/406 |
| 2007/0014269 A1 * | 1/2007 | Sherman et al. | 370/338 |

(Continued)

*Primary Examiner* — Marsha D. Banks Harold
*Assistant Examiner* — Christopher Wyllie
(74) *Attorney, Agent, or Firm* — PatentVentures; Bennett Smith; Korbin Van Dyke

(57) ABSTRACT

Methods and systems for mobility of mobile nodes in mesh networks are taught wherein the mobile mesh nodes choose an attachment point to another mesh node based on predetermined criteria, such as the characteristics of the attachment point's path to a reference destination, and other factors local to the attachment point, such as load and available capacity. The mobile nodes forward packets on each other's behalf. Static and mobile nodes and the links between them are treated differently from each other in view of their respectively different properties. A special metric is used for paths that include mobile links in addition to the static mesh links and wired mesh links. Mobility is handled completely transparently to any client devices attached to the mesh nodes, where this attachment could be wireless or wired.

24 Claims, 2 Drawing Sheets

U.S. PATENT DOCUMENTS

2007/0274228 A1* 11/2007 Nandagopalan et al. ..... 370/252
2008/0107034 A1* 5/2008 Jetcheva et al. ............... 370/238
2009/0168768 A1* 7/2009 Chiabaut et al. .............. 370/389
2009/0190531 A1* 7/2009 Jetcheva et al. ............... 370/328
2011/0075566 A1* 3/2011 Bellur et al. .................. 370/238

* cited by examiner

MESH NODE MOBILITY ACROSS STATIC AND MOBILE MESH NETWORKS

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. PCT Application Serial No. PCT/US2007/081325, filed Oct. 13, 2007, first named inventor Jorgeta Jetcheva, and entitled MESH NODE MOBILITY ACROSS STATIC AND MOBILE MESH NETWORKS, and U.S. Provisional Application Ser. No. 60/829,525, filed Oct. 13, 2006, first named inventor Jorgeta Gueorguieva Jetcheva, and entitled MESH NODE MOBILITY ACROSS STATIC AND MOBILE MESH NETWORKS.

BACKGROUND

1. Field

Advancements in mesh networks are needed to provide improvements in performance, efficiency, and utility of use.

2. Related Art

Unless expressly identified as being publicly or well known, mention herein of techniques and concepts, including for context, definitions, or comparison purposes, should not be construed as an indication that such techniques and concepts are previously publicly known or otherwise part of the prior art. All references cited herein (if any), including patents, patent applications, and publications, are hereby incorporated by reference in their entireties, whether specifically incorporated or not, for all purposes.

Mobile applications are becoming increasingly more popular in the context of mesh networks, e.g., for public safety applications, or for users being able to access the Internet while commuting via train.

Some applications are such that a mobile node is always able to reach a static (i.e., stationary, not mobile) mesh node directly (mobility within a static infrastructure), others are such that the mobile node needs to forward its traffic along a path composed of one or more other mobile nodes before it is able to reach the static infrastructure, still others are such that there is no static infrastructure and the mobiles only communicate with each other by forwarding packets on each other's behalf. Typically the static mesh infrastructure is attached to a wired network through a wired mesh portal. When there is no connection to the wired network, the mesh is referred to as a standalone mesh. In a traditional ad hoc network, typically the whole network is treated as a possibly mobile network.

As a mobile node moves, it may be within reach of multiple mesh networks, each of which might be configured with a distinct set of parameters, including different (sets of) channels, and may offer a distinct set of services. In order to maintain connectivity, the mobile needs to decide which mesh to use to relay its traffic to its destination(s). More broadly, as the mobile node moves around it needs to decide what node or nodes to use as immediate relay(s) towards its destination(s).

In a traditional wireless infrastructure network, e.g., Wi-Fi (802.11) Access infrastructure, or in the traditional cellular infrastructure, a mobile client can reach the infrastructure directly (along 1 wireless hop) and its decision about which of multiple nodes in the infrastructure to attach to is based on the quality of the link to the point of attachment in the infrastructure. The attachment point is then directly connected to the wired infrastructure.

In a traditional mesh, it is usually assumed that any node may communicate with any other node and so there isn't any notion of attachment or reference destination. Wi-Fi (802.11) does have the notion of attachment, however it refers to attachment only of clients to APs, where the APs tend to be directly connected to a wired networks, and is only based on the best signal strength of frames from the APs that is recorded at the client node. Cellular and WiMax networks have a similar architecture, where mobile clients attach to base stations which are static and the base stations are attached to the wired infrastructure.

In 802.11-style networks, clients do not send packets to each other directly at all and don't forward packets to each other (APs are not mobile). There is an ad hoc mode in 802.11 that enables clients to talk to each other directly but in that mode they are not able to talk to APs, and they still cannot forward traffic on each other's behalf.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the operations of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction may introduce illustrative combinations that tersely summarize illustrative systems and methods in accordance with the concepts taught herein. As is discussed in more detail in the Conclusions, the invention encompasses all possible modifications and variations within the scope of the issued claims.

DETAILED DESCRIPTION

Figure 1:
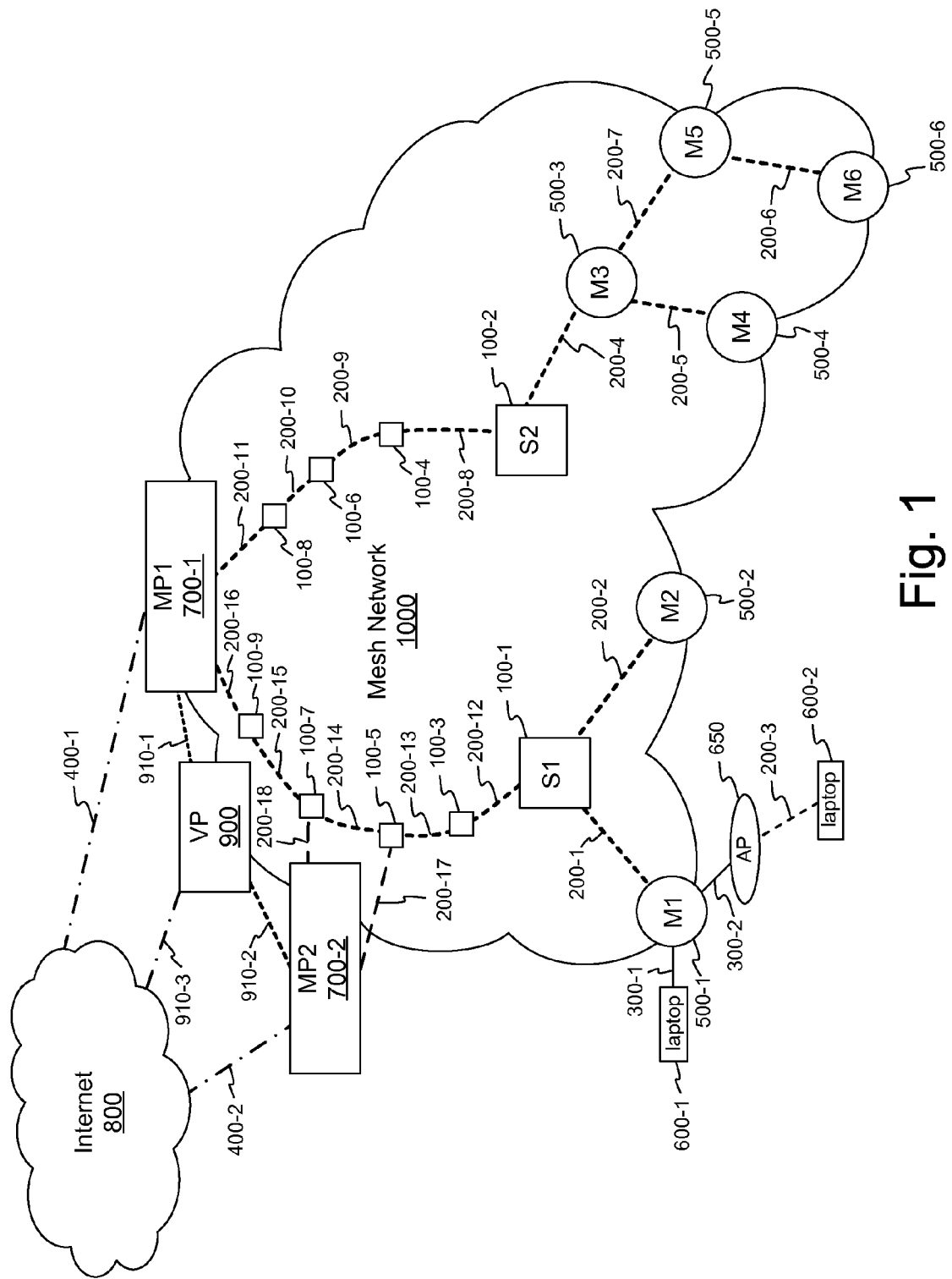
FIG. 1 illustrates embodiments of systems and methods for mesh node mobility in a mesh network having static and mobile nodes.

A detailed description of one or more embodiments of the invention is provided below along with accompanying figures that illustrate the principles of the invention. The invention is described in connection with the embodiments. It is well established that it is neither necessary, practical, or possible to exhaustively describe every embodiment of the invention. Thus the embodiments herein are understood to be merely illustrative, the invention is expressly not limited to or by any or all of the embodiments herein, and the invention encompasses numerous alternatives, modifications and equivalents. To avoid monotony in the exposition, a variety of word labels (including but not limited to: first, last, certain, particular, select, and notable) may be applied to separate sets of embodiments; as used herein such labels are expressly not meant to convey quality, or any form of preference or prejudice, but merely to conveniently distinguish among the separate sets. Wherever multiple embodiments serve to illustrate variations in process, method, and/or program instruction features, other implementations are contemplated that in accordance with a predetermined or a dynamically determined criterion perform static and/or dynamic selection of one of a plurality of modes of operation corresponding respectively to a plurality of the multiple embodiments. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Methods and systems for mobility of mobile nodes in mesh networks are taught wherein the mobile mesh nodes choose an attachment point to another mesh node based on the characteristics of the attachment point's path to a reference destination (e.g., the wired portal into the mesh), among other factors local to the attachment point such as load and available capacity. The mobile nodes forward packets on each other's behalf. Static and mobile nodes and the links between them are treated differently from each other in view of their respectively different properties, e.g., static links are much less likely to break, and static nodes usually have a (better) path to the reference destination and therefore connectivity to important other destinations. A special/unique metric is used for paths that include mobile links in addition to the static mesh links (between static mesh nodes) and wired mesh links. Mobility (including mobility across layer 3 domains) is handled completely transparently to any client devices attached to the mesh nodes, where this attachment could be wireless or wired. That is, the relay of client traffic in the mesh is managed such that client devices need not be aware of, and need not take into account, the mobile or static status of the nodes of the mesh. Further characteristics of the methods and systems taught herein include:

1. Mobile nodes can forward traffic on each other's behalf;
2. Mobiles are allowed to roam across meshes;
3. Mesh nodes may have one or more radios;
4. Mobile mesh nodes may have one or more radios;
5. Each mesh may have a different set of capabilities and may provide a different set of services; and
6. The mesh is not a standalone mesh but has one or more mesh portals onto another network (e.g., a wired network, or a cellular network, etc.).

FIG. 1 illustrates embodiments of these systems and methods for mesh node mobility in a mesh network 1000 having static and mobile nodes. The following table identifies each Reference Symbol of FIG. 1 by its corresponding Element Name.

Reference Symbol to Element Name Correspondence Table

| Ref. Symbol | Element Name |
| --- | --- |
| 100-1 | Static node S1 |
| 100-2 | Static node S2 |
| 100-3 | Static node |
| 100-4 | Static node |
| 100-5 | Static node |
| 100-6 | Static node |
| 100-7 | Static node |
| 100-8 | Static node |
| 100-9 | Static node |
| 200-1 | Wireless link |
| 200-2 | Wireless link |
| 200-3 | Wireless link |
| 200-4 | Wireless link |
| 200-5 | Wireless link |
| 200-6 | Wireless link |
| 200-7 | Wireless link |
| 200-8 | Wireless link |
| 200-9 | Wireless link |
| 200-10 | Wireless link |
| 200-11 | Wireless link |
| 200-12 | Wireless link |
| 200-13 | Wireless link |
| 200-14 | Wireless link |
| 200-15 | Wireless link |
| 200-16 | Wireless link |
| 200-17 | Wireless link |
| 200-18 | Wireless link |
| 300-1 | Wired link |
| 300-2 | Wired link |
| 400-1 | Multiple links and networks |
| 400-2 | Multiple links and networks |
| 500-1 | Mobile node M1 |
| 500-2 | Mobile node M2 |
| 500-3 | Mobile node M3 |
| 500-4 | Mobile node M4 |
| 500-5 | Mobile node M5 |
| 500-6 | Mobile node M6 |
| 600-1 | Client node (a first laptop) |
| 600-2 | Client node (a second laptop) |
| 650 | Client node (an Access Point, or AP) |
| 700-1 | Mesh Portal MP1 |
| 700-2 | Mesh Portal MP2 |
| 800 | Internet |
| 900 | Virtual Portal VP |
| 910-1 | Conceptual link between VP and MP1 |
| 910-2 | Conceptual link between VP and MP2 |
| 910-3 | Conceptual link between VP and Internet |
| 1000 | Mesh Network |

In FIG. 1, squares represent static (Sx) nodes 100-$x$. Dashed lines represent wireless links 200-$x$. Solid links represent wired links 300-$x$. Dash-dotted lines are intended to represent multiple underlying links and networks 400-$x$. Mobile (Mx) nodes 500-$x$ are shown to have a link only towards their primary attachment point. Some links between static nodes may be wired. Any node, static or mobile may have attached clients, wirelessly or through a wire. The AP 650 is viewed as a type of client. Mobile and static nodes may be interspersed along a mobile node's path. Thus it is not necessary that the overall path is mobile relays first and the only static relays after that.

The methods and systems illustrated in FIG. 1 and further described herein choose next-hop relays in the context of the following considerations:

1. A mobile node may be within range of multiple static and mobile nodes who can provide it with connectivity to its destination(s) and it needs to choose which one(s) to use for relaying its traffic;

2. A node does not usually know in advance what destinations it or its attached clients are going to communicate with, and so it cannot choose a next-hop relay(s) based on this kind of information;
3. If a node chooses next-hop relays based on the current destinations it is communicating with (or has observed its attached clients to be communicating with), and different relays provide different quality connectivity (e.g., bandwidth, lossyness) to each destination, trade-off decisions need to be made in favor of some clients vs. others, which makes the choice of relays complex;
4. Since each possible next hop relay can be on a different channel, choosing a (set of) next-hop relay(s) may mean choosing against all other next hop relays because they would be left on a different channel; and
5. Evaluating the connectivity along a path to each destination of a mobile requires discovering paths to each destination of the mobile, which if done in advance would generate a prohibitive amount of overhead because routes to all destinations must be known by all nodes (because any mobile may request connectivity from a node at any time and to any destination), or if the discovery is done at the time a mobile needs to select a relay due to impending or current disconnection, then the discovery would cause a delay and possibly packet losses.

The mobility of a mesh node in the embodiments taught herein differ from the traditional model described in the background in the following ways:

a) A mobile node may achieve connectivity by connecting through other mobile nodes, not just through nodes that are part of the static mesh infrastructure.
b) The static mesh infrastructure may itself be composed of multiple wireless hops.
c) In the mobility model taught herein, the mobile node chooses an attachment point which is different from what regular mesh nodes normally do. This is in contrast to a traditional mesh, where the assumption is usually that any node may communicate with any node. Thus in the traditional mesh there isn't any notion of attachment or reference destination.
d) Wi-Fi (802.11) does have the notion of attachment, however it refers to attachment only of clients to APs, where the APs tend to be directly connected to a wired networks, and is only based on the best signal strength of frames from the APs that is recorded at the client node. Cellular and WiMax networks have a similar architecture, where mobile clients attach to base stations which are static and the base stations are attached to the wired infrastructure. In the methods and systems taught herein, a mobile mesh node is attached to another mesh node, and the mobile node chooses the point of attachment point based on the characteristics of its path to a reference destination (e.g., the wired portal into the mesh), among other factors local to the attachment point such as load and available capacity. (The connectivity of the mobile node is not only determined based on the properties of the link between the mobile node and its next hop towards its destination(s) but on the quality of the entire path between the mobile and its destination(s)).
e) In the methods and systems taught herein, mobile nodes forward packets on each other's behalf. This is not the case in 802.11-style networks, where clients do not send packets to each other directly at all and don't forward packets to each other. There is an ad hoc mode in 802.11 that enables clients to talk to each other directly but in that mode they are not able to talk to APs, and they still cannot forward traffic on each other's behalf.
f) In a traditional ad hoc network, typically the whole network is treated as a possibly mobile network. In the methods and systems taught herein, the static and mobile nodes and the links between them are treated differently from each other in view of their different properties, e.g., static links are much less likely to break, and static nodes usually have a (better) path to the reference destination and therefore connectivity to important other destinations.
g) In the methods and systems taught herein, a special/unique metric is used for paths that include mobile links in addition to the static mesh links (between static mesh nodes) and wired mesh links.
h) As taught herein, mobility (including mobility across layer 3 domains) is handled completely transparently to any client devices attached to our mesh nodes, where this attachment could be wireless or wired. In accordance with the teachings herein, there can be multiple clients attached to a mobile node, including 802.11-style APs, which themselves may have multiple attached clients (static or mobile).

PARTICULAR EMBODIMENTS

As described in detail below, the embodiments introduced above use the following mechanisms for enabling a mobile node to choose next hop relay(s):

a) Choose a reference destination for connectivity;
b) Evaluate the path to the reference destination; and
c) Choose the next-hop relay(s) (attachment point(s)).

Choosing a Reference Destination for Connectivity:

In the vast majority of cases the mobile's traffic needs to ultimately reach the wired network infrastructure, both because it needs to communicate with outside nodes, but also because it may be visiting a layer 3 domain that is not its home layer 3 domain (i.e., the one where it obtained its IP address) and therefore its traffic would have to be tunneled to its home domain through the wired portal (e.g., as in Mobile IP). As a result, the closest portal to the wired network (such as to the Internet 800, as illustrated in FIG. 1) is a great reference point for connectivity as it is the likely entry/exit for all or most of a mobile's packets. When there are multiple portals from the mesh network to the wired network, it can be useful to conceptualize a single virtual portal as the reference destination. FIG. 1 shows the virtual portal 900 conceptually coupled to MP1 700-1 and MP2 700-2 respectively via links 910-1 and 910-2 and conceptually coupled to the wired network via link 910-3.

Benefits and advantages of choosing a reference destination in accordance with the techniques taught herein, include:

a) Choosing a single reference destination enables more efficient distribution of routing state within the network, as nodes only need to have a route to the reference destination in advance of a mobile attempting to attach/connect through them;
b) Having a single reference destination also simplifies the choices a mobile node has to make as it moves in terms of where to attach at any given time; and
c) Optimizing connectivity based on the quality of the path to the reference destination would lead to optimal performance as most of a mobile's traffic is likely to go through the reference destination.

Evaluation of the Path to the Reference Destination:

Sophisticated route metrics for static mesh networks often do not perform well in mobile networks because they focus on computing the achievable capacity along a path and do not take into account that some nodes along a path may be mobile. In fact, the simplest and most common route metric, shortest hop count, tends to perform very well in a mobile scenario because the less links there are in a path, the less likely it is to break. Given that the path from a mobile to the reference destination may include both links whose endpoints are both mobile nodes, and links whose endpoints are both static nodes, and links with one mobile and one static node, we can use the following metric to evaluate the quality of the path to the reference destination:

a) Mobile hop count, i.e., number of mobile links, where both endpoints of the link are mobile;
b) Break ties (if any after the foregoing) by mobile hop count where one endpoint of the link is mobile;
c) Break ties (if any after the foregoing) by achievable bandwidth along the entire path;
d) Break ties (if any after the foregoing) by wireless hop count; and
e) Break ties (if any after the foregoing) by total hop count (wired and wireless).

Thus, if the metrics of two paths are equal at one stage the "tie" is broken by progressing to the next stage. First, mobile links with two mobile endpoints are counted for each path. So for example, if one path has 10 mobile links (of two mobile endpoints), and another has 5, the latter would be chosen as the preferred path. If both paths have the same number of mobile links of two mobile endpoints, mobile links with only one mobile endpoint are then counted for each path. If both paths have 5 mobile links (of one mobile endpoint), then we break the tie by comparing the next component of the metric, c) capacity. (It is envisioned that certain embodiments will establish predetermined criteria for how nearly proximate separate capacity determinations need to be for them to be logically considered the same capacity.) If they still look the same then we look at the next component, d), and etc. Once we run out of components to compute, and the paths still have the same metric, we can pick one according to another predetermined criteria (at random for example).

Figure 2:
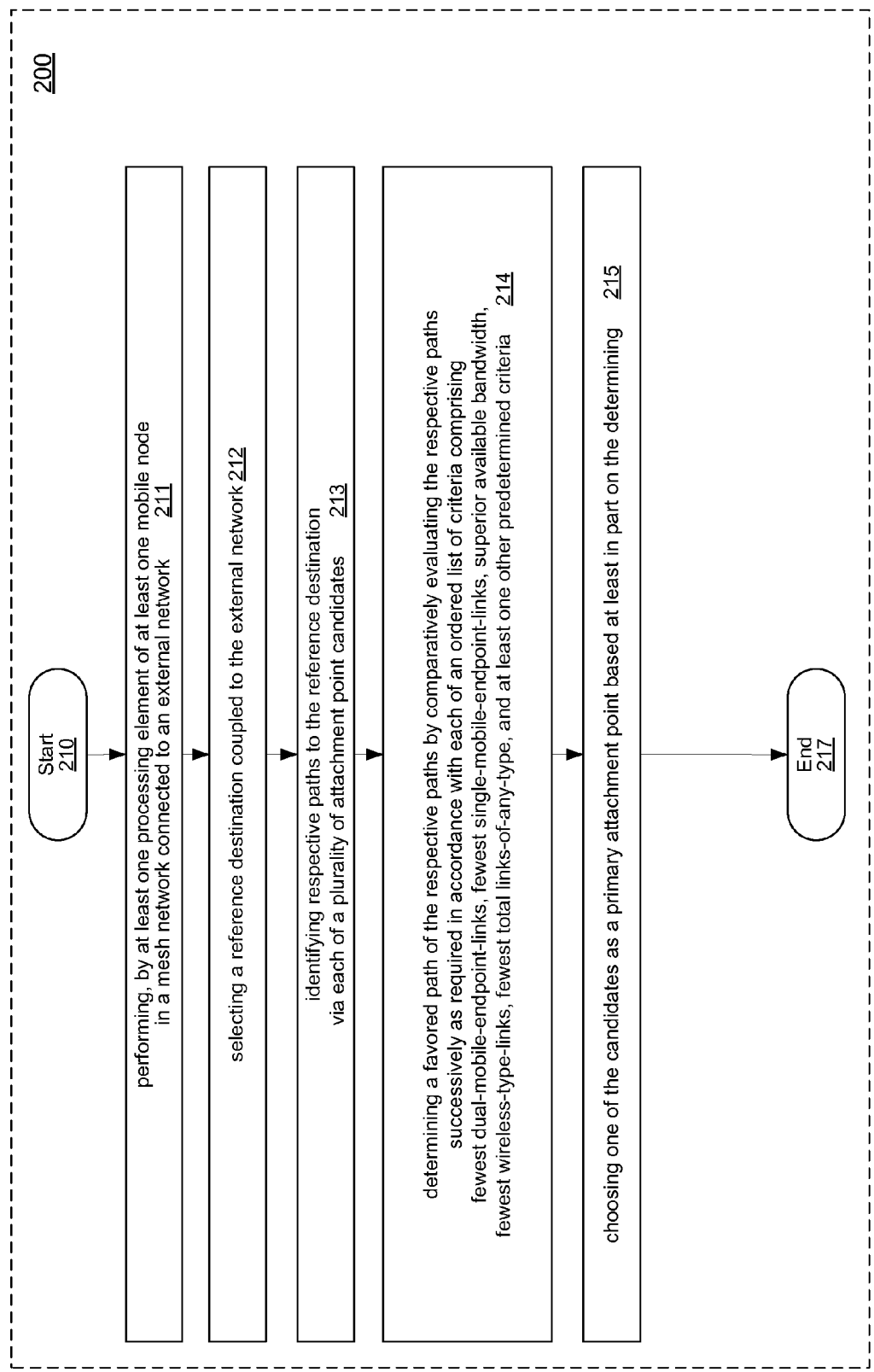
FIG. 2 illustrates a flow chart for a mesh node mobility embodiment in a mesh network having static and mobile nodes.

The forgoing path evaluation process is illustrated by embodiment 200 of the flow chart of FIG. 2. Beginning at start 210 and continuing through end 217, process 200 includes actions 211 (performing . . . ), 212 (selecting . . . ), 213 (identifying . . . ), 214 (determining . . . ), and 215 (choosing . . . ). Determining action 214 comprises sequential evaluations a-e above.

Choosing Next-Hop Relay(s) (Attachment Point(s)):

The mobile node can choose which neighboring nodes to use as its next-hop relay by finding out which one has the best path metric towards the reference destination using the metric above (finding out neighbor information can be done through probing and scanning—periodic or on-demand, e.g., when disconnection occurs or is expected to occur).

Benefits and advantages of choosing the next-hop relay(s) in accordance with the techniques taught herein, include:

a) A mobile may choose to have one next hop relay towards the reference destination, or may choose to have a primary relay and a secondary (backup) relay;
b) Choosing more relays than a primary and a backup relay, is often undesirable especially when a mobile node moves fairly fast as it may lead to the creation of more state (in the relays and in the mesh in general) that would then have to be torn down as soon as the mobile node moves; and
c) Choosing fewer next hop relays reduces the overhead of maintaining the links to the relays (such maintenance often employs keepalives to keep track of the existence and quality of mobile links in order to quickly detect an impending disconnection).

Additional parameters considered in the choice of relay may include one or more of:

a) Load of the relay node (less loaded relay tends to be preferable);
b) Residual capacity of the relay (how much capacity does the relay have left);
c) Services offered by the relay (e.g., some relays may offer QoS, others may not);
d) Cost of using the relay (visiting some meshes may be more expensive than visiting others); and
e) Overhead of switching to the relay, e.g.:
   1) If the relay is in a different layer 3 domain from the current relay for the mobile, the mobile would have to perform a layer 3 handoff; and
   2) If the relay is in a different security domain from the current relay for the mobile, the mobile may have to perform an authentication and authorization handshake with the new domain.

CONCLUSION

There are many ways of implementing the invention. It is generally appreciated that it is rarely practical or possible to exhaustively describe every embodiment of an invention. Thus the foregoing embodiments are understood to be merely illustrative, the invention is expressly not limited to or by any or all of the embodiments herein, and the invention encompasses numerous alternatives, modifications and equivalents.

Many variations in construction, arrangement and use are contemplated consistent with the teachings and within the scope of the claims of the issued patent. For example, the degree of parallelism or instantiation (i.e., the dimension, number, or width) of interconnect and function-units, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications, are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (facilitating migration of functions previously in hardware into software) and higher integration density (facilitating migration of functions previously in software into hardware).

Example variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application. Wherever multiple embodiments serve to illustrate variations in process, method, and/or program instruction features, other implementations are contemplated that in accordance with a predetermined or a dynamically determined criterion perform static and/or dynamic selection of one of a plurality of modes of operation corresponding respectively to a plurality of the multiple embodiments.

To provide a thorough understanding the embodiments have been illustrated with detail and environmental context well beyond that required for a minimal implementation of many of aspects of the concepts taught. Variations may omit disclosed components or features without altering the basic cooperation among the remaining elements. Thus the invention may be practiced according to the claims without some or all of these specific details. To the extent that the remaining elements are distinguishable from the prior art, components and features that may be so omitted are not limiting on the concepts taught herein. For the purpose of clarity, technical material that is known in the technical fields related to the invention has not been described in detail so that the invention is not unnecessarily obscured.

Certain choices have been made in the presentation of this disclosure merely for reasons of convenience in preparing the text and drawings. Unless there is an indication to the contrary these choices of convenience should not be construed per se as conveying additional or implicit information regarding the structure or quality of the embodiments illustrated. Illustrative examples of such choices of convenience include: the particular organization or assignment of the designations used for the figure numbering and the particular organization or assignment of the element identifiers (i.e., the callouts or numerical designators) used to identify and reference the features and elements of the embodiments. To avoid monotony in the exposition, a variety of word labels (including but not limited to: first, last, certain, particular, select, and notable) may be applied to separate sets of embodiments; as used herein such labels are expressly not meant to convey quality, or any form of preference or prejudice, but merely to conveniently distinguish among the separate sets.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims of the issued patent.

What is claimed is:

1. A method for facilitating the mobility of a mobile node in a mesh network connected to an external network, the method comprising:
   selecting a reference destination coupled to the external network;
   identifying respective paths to the reference destination via each of a plurality of attachment point candidates;
   determining a favored path of the respective paths by comparatively evaluating the respective paths successively as required in accordance with each of an ordered list of criteria comprising fewest dual-mobile-endpoint-links, fewest single-mobile-endpoint-links, superior available bandwidth, fewest wireless-type-links, fewest total links-of-any-type, and at least one other predetermined criteria; and
   choosing one of the candidates as a primary attachment point based at least in part on the determining; and
   wherein the reference destination and the candidates are among a plurality of nodes of the mesh network, and the selecting, the identifying, the evaluating, and the choosing, are with respect to the mobile node.

2. The method of claim 1, wherein the at least one other predetermined criteria comprises a random pick.

3. The method of claim 1, wherein the candidates comprise at least one mobile node.

4. The method of claim 1, wherein at least one of the respective paths comprises at least one mobile node.

5. The method of claim 1, wherein at least some of the plurality of nodes comprise a static mesh infrastructure.

6. The method of claim 5, wherein the static mesh infrastructure is comprised at least in part of a plurality of wireless hops.

7. The method of claim 1, wherein at least some of the plurality of nodes are mobile and the mobile nodes forward packets on each other's behalf.

8. The method of claim 1, wherein client devices obtaining connectivity via the mesh network need not take into account whether any of the plurality of nodes are mobile.

9. The method of claim 1, further comprising: at least one node of the plurality of nodes behaving like a static node at a first time and behaving like a mobile node at a second time.

10. The method of claim 9, further comprising: predetermining the times at which each behaving state occurs.

11. The method of claim 9, further comprising: with respect to the at least one node, detecting the behaving state change and repeating at least the evaluating and the choosing.

12. The method of claim 1, wherein the reference destination is a mesh portal through which it is expected that a majority of the mobile node's packets will traverse into and out of the mesh network.

13. The method of claim 1, wherein the reference destination is a virtual portal conceptually coupled to the external network and to at least two physical mesh network portals actually coupled to the external network.

14. The method of claim 1, wherein at least a plurality of the nodes act as mesh portals coupling the mesh network with the external network and the selecting the reference destination comprises selecting the particular one of the mesh portals closest to a wired network infrastructure portion of the external network.

15. The method of claim 1, wherein at least a plurality of the nodes act as mesh portals coupling the mesh network with the external network and the selecting the reference destination comprises selecting the particular one of the mesh portals through which the majority of the mobile node's packets traverse into and out of the mesh network.

16. The method of claim 1, further comprising: choosing one of the candidates as a backup attachment point based at least in part on the evaluating.

17. A mobile node adapted to participate in a mesh network connected to an external network, the mobile node comprising:
   means for selecting a reference destination coupled to the external network;
   means for identifying respective paths to the reference destination via each of a plurality of attachment point candidates;
   means for determining a favored path of the respective paths by comparatively evaluating the respective paths successively as required in accordance with each of an ordered list of criteria comprising fewest dual-mobile-endpoint-links, fewest single-mobile-endpoint-links, superior available bandwidth, fewest wireless-type-links, fewest total links-of-any-type, and at least one other predetermined criteria;

means for choosing one of the candidates as a primary attachment point based at least in part on the determining; and wherein the reference destination and the candidates are among a plurality of nodes of the mesh network, and the selecting, the identifying, the evaluating, and the choosing, are with respect to the mobile node.

18. The mobile node of claim 17, wherein the at least one other predetermined criteria comprises a random pick.

19. The mobile node of claim 17, wherein the candidates comprise at least one mobile node.

20. The mobile node of claim 17, wherein at least one of the respective paths comprises at least one mobile node.

21. A non-transitory computer readable medium having a set of instructions stored therein that, when executed by a processing element of at least one mobile node in a mesh network connected to an external network, causes the processing element to perform functions comprising:

selecting a reference destination coupled to the external network;

identifying respective paths to the reference destination via each of a plurality of attachment point candidates;

determining a favored path of the respective paths by comparatively evaluating the respective paths successively as required in accordance with each of an ordered list of criteria comprising fewest dual-mobile-endpoint-links, fewest single-mobile-endpoint-links, superior available bandwidth, fewest wireless-type-links, fewest total links-of-any-type, and at least one other predetermined criteria;

choosing one of the candidates as a primary attachment point based at least in part on the determining; and wherein the reference destination and the candidates are among a plurality of nodes of the mesh network, and the selecting, the identifying, the evaluating, and the choosing, are with respect to the mobile node.

22. The non-transitory computer readable medium of claim 21, wherein the at least one other predetermined criteria comprises a random pick.

23. The non-transitory computer readable medium of claim 21, wherein the candidates comprise at least one mobile node.

24. The non-transitory computer readable medium of claim 21, wherein at least one of the respective paths comprises at least one mobile node.

* * * * *